United States Patent [19]

Kato et al.

[11] 4,387,755

[45] Jun. 14, 1983

[54] PNEUMATIC TIRES

[75] Inventors: Masaki Kato, Isehara; Tuneo Morikawa; Kazuyuki Kabe, both of Hiratsuka, all of Japan

[73] Assignee: The Yokohama Rubber Co., Ltd., Tokyo, Japan

[21] Appl. No.: 220,913

[22] Filed: Dec. 29, 1980

[30] Foreign Application Priority Data

Dec. 28, 1979 [JP] Japan .................. 54-170396

[51] Int. Cl.$^3$ .................. B60C 11/00; B60C 9/00
[52] U.S. Cl. .................. 152/209 R; 57/902; 152/356 R; 152/359; 152/361 FP; 152/361 DM
[58] Field of Search ..... 192/209 R, 361 FP, 361 DM, 192/361 R, 354 R, 356 R, 359; 57/902, 212, 237, 243

[56] References Cited

U.S. PATENT DOCUMENTS

| | | | |
|---|---|---|---|
| 3,126,042 | 3/1964 | Cegnar | 152/361 DM |
| 3,404,721 | 10/1968 | Massoubre | 152/361 FP |
| 3,799,230 | 3/1974 | Montagne | 152/209 R |
| 3,831,656 | 8/1974 | Senger et al. | 152/361 FP |
| 3,851,693 | 12/1974 | Takemura et al. | 152/361 DM |
| 4,258,774 | 3/1981 | Mirtain et al. | 152/209 R X |
| 4,262,725 | 4/1981 | Rodenkirch | 152/361 DM |

FOREIGN PATENT DOCUMENTS 992858 7/1976 Canada .

Primary Examiner—Edward C. Kimlin
Assistant Examiner—Thomas Bokan
Attorney, Agent, or Firm—Armstrong, Nikaido, Marmelstein & Kubovicik

[57] ABSTRACT

A pneumatic tire having a tread reinforcement layer constituted by a steel cord strip layer adjacent the carcass and an aromatic polyamide cord strip layer superposed to the steel cord strip layer in a parallel side-by-side relationship. The aromatic polyamide cord strip layer is folded at its both edges toward the center, in such a manner that the folded portions contact the main portion in a parallel side-by-side relationship. The main portion has a width ranging between 100 and 110% of the width of the tread surface, while the width of each folded portion ranges between 27.5 and 35% of the width of main portion. Furthermore, the free edge of each folded portion is located at a distance from the center of the outermost circumferential groove in the tread surface, which distance being between 25 and 75% of the distance between the outermost groove and the adjacent groove.

4 Claims, 7 Drawing Figures

PNEUMATIC TIRES

BACKGROUND OF THE INVENTION

The present invention relates to pneumatic tires and, more particularly, to an improvement in radial tires having a tread reinforcement constituted by a steel cord strip layer.

Radial tires having a tread reinforcement layer constituted by steel cord strip layers exhibit much superior load bearing characteristic and durability in high-speed running to those exhibited by radial tires having a tread reinforcement layer constituted by textile cord strip layers.

The radial tires having a tread reinforcement layer constituted by steel cord strip layers, however, have some drawbacks.

Firstly, when the tread surface is damaged, water comes into the tire structure through the damage in the tread to reach the steel cord strip layers to make the latter rusty to decrease the reinforcement effect. Secondly, the steel cord strip layers, which are usually in the form of two superposed layers, impart a rough and unpleasant passenger comfort to tires incorporating the same. Thirdly, since the steel cord strip layers have a Young's modulus much greater than that of rubber, the separation of rubber from the steel cord strip layers takes place at both edges of the latter during high-speed running or under application of heavy load, resulting in a breakdown of the tire. The performance of the tire in high-speed running can be improved by selecting the width of the strip layers greater than the tread surface width. The increase of the width of the strip layers, however, increase the liability of separation of rubber from the strip layers at both edges of the latter, particularly when the cords are made of a material having a large Young's modulus as is the case with steel. Therefore, it is not allowed, practically, to increase the width of the steel cord strip layers beyond the width of the tire tread.

BRIEF SUMMARY OF THE INVENTION

It is, therefore, a major object of the invention to provide a pneumatic tire having a tread reinforcement layer constituted by steel cord strip layers in which the reduction of reinforcement effect due to rust of steel cords by the water invading through the damage in the tread surface is avoided.

Another object of the invention is to provide a pneumatic radial tire having a tread reinforcement layer constituted by steel cord strip layers, capable of affording an improved comfort to passengers on an automobile mounting the tire.

Still another object of the invention is to provide a pneumatic radial tire having a tread reinforcement layer constituted by steel cord strip layers, in which the durability in heavy load running and high-speed running are improved in spite of reduction in the number of the steel cord strip layers.

To these ends, according to the invention, there is provided a pneumatic tire comprising: a tread having a radial carcass therein, and a reinforcement layer disposed between the tread and said carcass and having a steel cord strip layer adjacent the carcass and an aromatic polyamide cord strip layer adjacent the tread surface, the steel cord strip layer and the aromatic polyamide cord strip layer being superposed in a parallel side-by-side relationship; the aromatic polyamide cord strip layer being folded at its both edges toward the center of the tire such that the folded portions contact the central main portion in a parallel side-by-side relationship, the main portion having a width amounting to 100 to 110% of the width of the tread surface, each of the folded portion having a width amounting to 27.5 to 35% of the width of the main portion, the free edge of each folded portions being spaced from the center of the outermost circumferential groove formed in the tread surface by a distance amounting to 25 to 75% of the distance between the outermost groove and the adjacent groove.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
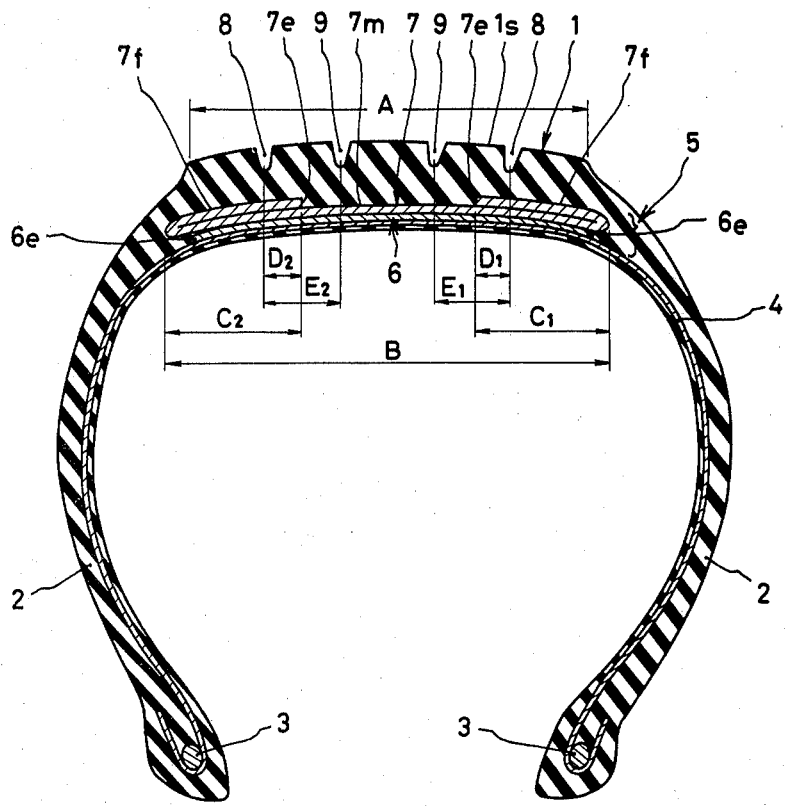
FIG. 1 is a longitudinal sectional view of a pneumatic tire constructed in accordance with the invention.
Figure 2:
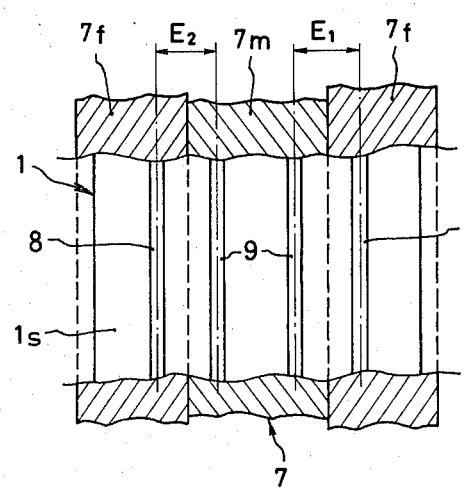
FIG. 2 is a plan view of a portion of the pneumatic tire shown in FIG. 1, in which a part thereof is removed to make the reinforcement layer visible.
Figure 3:
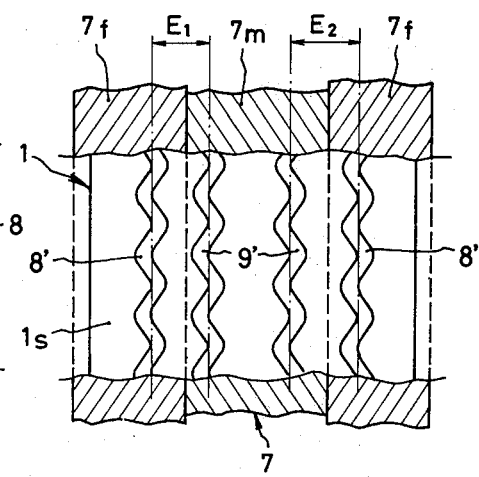
FIG. 3 is a plan view of a pneumatic tire constructed in accordance with another embodiment of the invention, in which a part of the tire is removed to make the reinforcement layer visible.

Referring to FIG. 1, a reference numeral 1 denotes a tread from both axial ends of which extended radially are side walls 2 and 2. Bead wires 3 and 3 are embedded in the ends of respective side walls 2 and 2. A carcass 4 is placed under the tread 1 and the side walls 2 and 2 so as to extend between one and the other of the bead wires 3 and 3.

The carcass 4 is so-called radial carcass constituted by cords which are inclined generally at an angle of 85° to 90° to the circumferential direction of the tire. The invention, however, does not exclude tires in which the cords are inclined at an angle of 75° to 90° to the circumferential direction of the tire.

A reinforcement layer 5 is embedded between tread 1 and carcass 4. The reinforcement layer 5 is constituted by a steel cord strip layer 6 disposed at the inside of the carcass 4 and an aromatic polyamide cord strip layer 7 superposed to the steel cord strip layer 6 in contact with the latter in a parallel side-by-side relationship. The steel cord strip layer 6 and the aromatic polyamide cord strip layer 7 are arranged in singular. The steel cords and the aromatic polyamide cords constituting these layers 6 and 7 are arranged to cross each other, and make an angle of 10° to 30° to the circumferential direction of the tire.

Both end portions of the steel cord strip layer 6 are unfolded while the aromatic polyamide cord strip layer 7 is folded at its both edges toward the center, in such a manner that folded portions 7f are superposed to the main portion 7m in parallel side-by-side relationship in contact with the latter.

The lateral width B of the main portion 7m of the aromatic polyamide cord strip layer 7 is selected to fall between 100 and 110% of the width A of surface 1s of the tread 1. The widths $C_1$ and $C_2$ of both folded portions 7f and 7f are selected to fall between 27.5 to 35%, preferably between 30 and 32.5%, of the width B of the main portion 7m. The free edge 7e of each folded portion 7f is positioned between the outermost groove 8 formed in the tread surface 1s and the groove 9 which is adjacent the groove 8. The distances $D_1$ and $D_2$ of the free edge 7e from the center of the groove 8 is selected to fall between 25 and 75% of the distance $E_1$ and $E_2$ between the center of the grooves 8 and 9 at each side of the tire. When the grooves 8 and 9 are straight grooves, the distances $E_1$ and $E_2$ are measured at centers of these grooves. However, if the grooves 8' and 9' are zig-zag grooves, the distances are measured at mean centers of these zig-zag grooves 8' and 9'.

If the free end 7e of the folded portion 7f is positioned too close to the groove 8 or 9, a stress concentration will occur at the groove bottom to increase the liability of occurrence of the breakage at the groove. It is, therefore, recommended that the free edge 7e be located substantially at the mid point between the grooves 8 and 9. It is also preferred, to make full use of the above-described advantage, that the distances $E_1$ and $E_2$ between the centers of the grooves 8 and 9 are selected to be 15% or greater of the width A of the tread surface 1s and the total number of the grooves 8 and 9 is 3 to 5.

Both edges of the aromatic polyamide cord strip layer are bent in such a manner that the folded portions 7f and 7f overlay the main portion 7m in contact with the latter. Thus, the folded portions 7f and 7f do not wrap both edges 6e and 6e. The main portion 7m, however, has a width B large enough to make the main portion 7m extend laterally beyond both edges 6e and 6e of the steel cord strip layer 6.

Preferably, the aromatic polyamide cord has a negligibly small thermal shrinkage, as well as a tensile strength and Young's modulus of higher than 10 g/d and higher than 1500 kg/mm², respectively. It is possible to use, as this aromatic polyamide cord, a fiber produced by E. I. Du Pont de Nemours & Co., Ltd. under the commercial name of "Kevlar".

Separation of rubber from the steel cord strip layer 6 is liable to occur at both cut edges 6e and 6e of the latter, due to a stress concentration. The separation of rubber due to the stress concentration, however, is overcome partly because the cut edges 6e and 6e of the steel cord strip layer 6 are overlaid by the folded edges of the aromatic polyamide cord strip layer 7 having a Young's modulus smaller than that of the steel cord strip layer 6, and partly because the rubber is bonded to the steel cord strip layer at a sufficiently high adhesion force. It is, therefore, possible to obtain a sufficiently high durability in heavy-load and high-speed running.

The water content of the aromatic polyamide cord is less than 8% which is about a quarter of that of conventional rayon cord. Since this aromatic polyamide cord strip layer is disposed at the side of the steel cord strip layer 6 adjacent the tread surface, the invasion by water is suppressed even when the water has come into the tread through a crack or the like damage formed in the tread 1, so that the steel cord strip layer is effectively prevented from becoming rusty.

Since the aromatic polyamide cord layer has a Young's modulus greater than that of conventional rayon or nylon cord strip layer, it is not necessary to use two steel cord strip layers. Namely, it is possible to obtain a sufficiently high reinforcement effect with a single steel cord strip layer. Therefore, tires according to the present invention can effectively attain an improvement in the passenger comfort, which is only rough and unpleasant with radial tires incorporating two steel cord strip layers, and can afford a highly desirable comfort.

Figure 4:
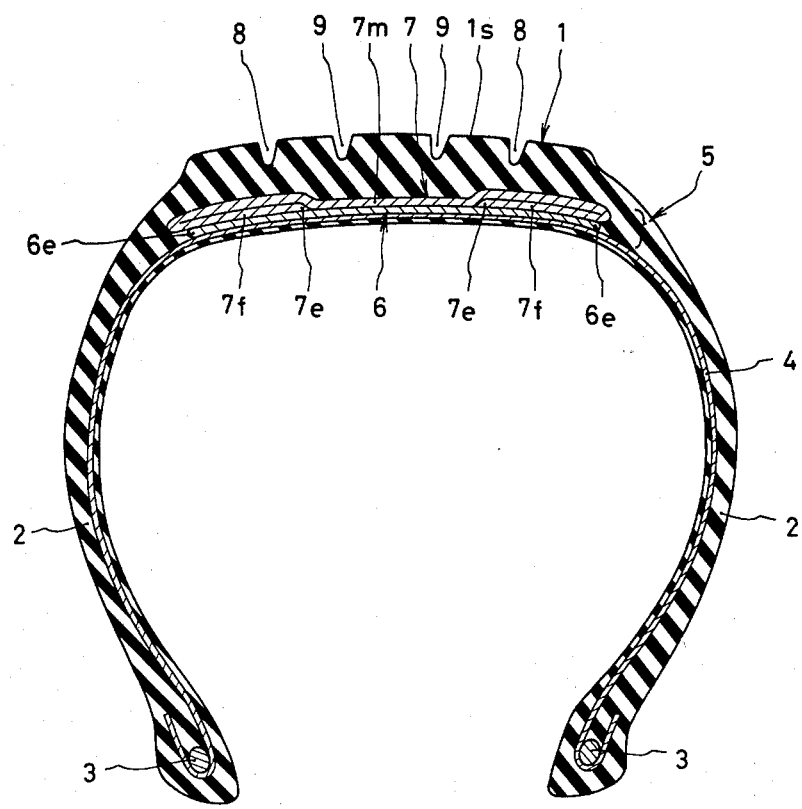
FIG. 4 is a longitudinal sectional view of a pneumatic tire constructed in accordance with still another embodiment of the invention.

FIG. 4 shows another embodiment of the invention in which the folded portions 7f of the aromatic polyamide cord strip layer 7 are not bent toward the tread surface as in the case of FIG. 1, but are folded toward the steel cord strip layer. In this case also, the folded portions 7f and 7f do not wrap the edges 6e and 6e of the steel cord strip layer 6 but are superposed to the main portion 7m in a parallel side-by-side relationship. Other points are materially identical to those in FIG. 1, and the same advantages are derived from this embodiment as the preceding embodiment.

EXAMPLE 1

As in the case of the embodiment shown in FIG. 1, one steel cord strip layer is disposed adjacent the carcass side, and an aromatic polyamide cord strip layer is superposed to the steel cord strip layer. The aromatic polyamide cord layer is folded at its both edges toward the center. With this reinforcement layer, a variety of tires were prepared, which had values of 90%, 95%, 100%, 105%, 110% and 115% for the ratio of the width B of the main portion of the aromatic polyamide cord strip layer to the width A of the tread surface. Also prepared were radial tires incorporating a reinforcement layer constituted by two steel cord strip layers, of which ratios of the width B of the steel cord strip layers to the width A of the tread surface were 90%, 95%, 100% and 105%, respectively. All tires had a size of 195/70HR14.

These tires were subjected to an actual running test in which tires were tested at an automobile running speed of 80 km/hr with the initial pneumatic pressure of 2.1 kg/cm² and initial load of 525 kg. The load was increased by 100 kg at every 5 hours (400 km running), till the tires were broken. The values of the loads at which the tires were broken are plotted in the graph shown in FIG. 5.

Figure 5:
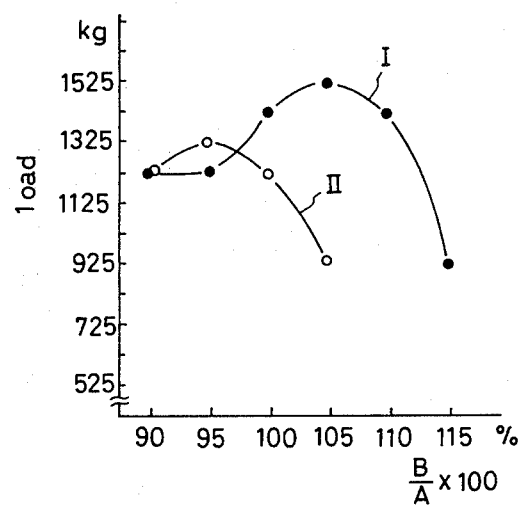
FIG. 5 is a graph showing the relationship between the load imposed on the pneumatic tire and the ratio of the width of the reinforcement layer to the width of the tread surface.

More specifically, in FIG. 5 the curve I represents the result of the test obtained with the radial tires having a reinforcement layer constituted by a steel cord strip layer and an aromatic polyamide cord strip layer, while the curve II shows the result of the test obtained with tires having a reinforcement layer constituted by two steel cord strip layers.

As will be seen from FIG. 5, an excellent durability in heavy-load running is obtained when the width B of the main portion of the aromatic polyamide cord strip layer is selected to fall between 100 and 110% of the width A of the tread surface.

EXAMPLE 2

As in the case of FIG. 1, the reinforcement layer was composed of one steel cord strip layer adjacent the carcass and one aromatic polyamide cord strip layer superposed to the steel cord strip layer and bent at both edges toward the center. Radial tires incorporating the above reinforcement layer were prepared, of which lengths $C_1$ and $C_2$ of folded portions were identical with each other and their ratios to width B of the main portion were within the range of 20 to 40% by 2.5% for each variation. With all tires, the width B of the main portion was 105% of the width A of the tread surface and the tire size was 195/70HR14.

These tires were subjected to an actual running test in which, with a pneumatic pressure of 2.1 kg/cm$^2$ and a load of 540 kg, the running speed was increased in a stepped manner by 8 km/hr at every 30 minutes, till the tires were broken. The speeds at which tires were broken are plotted in FIG. 6.

Figure 6:
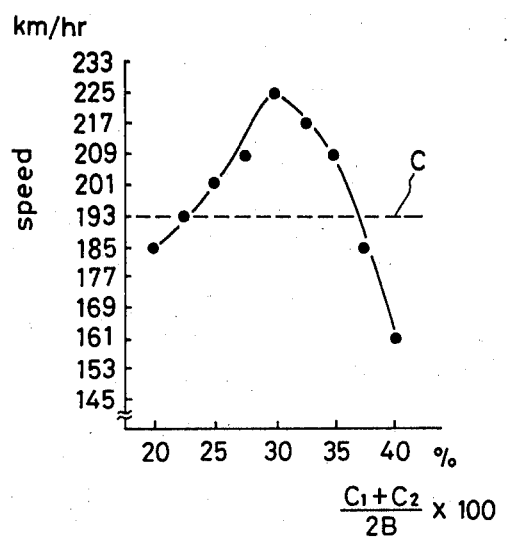
FIG. 6 is a graph showing the relationship between the running speed of pneumatic tire and the ratio of width of folded portion to that of main portion of an aromatic polyamide strip layer.

More specifically, in FIG. 6 the broken line C represents levels of conventional radial tires having a reinforcement layer constituted by two steel cord strip layers. From FIG. 6, it will be seen that an excellent durability in high-speed running is obtained when widths $C_1$ and $C_2$ of folded portions of the aromatic polyamide cord strip layer are selected to fall between 27.5 and 35% of the width B of main portion of the same.

EXAMPLE 3

As in the case of FIG. 1, a reinforcement layer was constituted by one steel cord strip layer adjacent the carcass and an aromatic polyamide cord strip layer superposed to the steel cord strip layer and folded at both edges toward the center. The ratio of the width B of the main portion to the width A of the tread surface was selected to be 105%, while widths $C_1$ and $C_2$ of the folded portions were determined to be 30% of the width B of the main portion. With this reinforcement layer, a plurality of tires were formed to have various values of the ratio of the distances $D_1$ and $D_2$ of the free edges of both folded portions from the center of the groove 8 to the distances $E_1$ and $E_2$ between grooves 8 and 9. In each tire, the distances $E_1$ and $E_2$ were selected to be equal and so were the distances $D_1$ and $D_2$. Grooves 8 and 9 were arranged in symmetry with respect to the center of the tread surface. The tire size was 195/70HR14 in each case.

Figure 7:
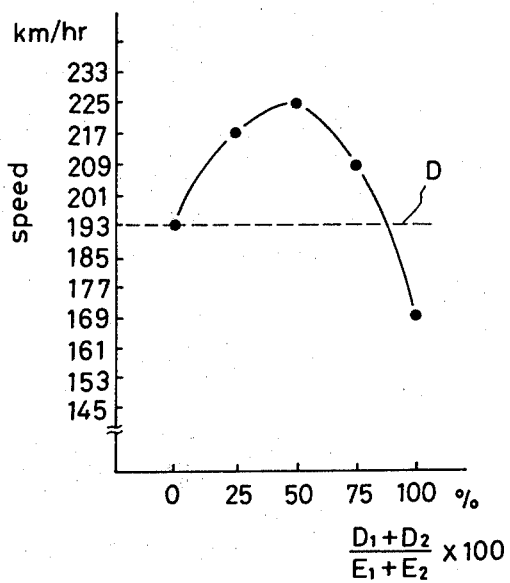
FIG. 7 shows the relationship between the running speed of pneumatic tire and the ratio of the distance of the free edge of the folded portion from the center of the outermost circumferential tread groove to the distance between two adjacent circumferential tread grooves.

These tires were subjected to a running test conducted under the same conditions as in Example 2 to examine the durability in the high-speed running, the result of which is shown in FIG. 7. In FIG. 7, the broken line curve D shows the levels of the conventional radial tire having a reinforcement layer constituted by two steel cord strip layers. As will be seen from FIG. 7, a superior durability in the high-speed running was obtained when the distances $D_1$ and $D_2$ of the free edges of folded portions from the center of the groove 8 were selected to fall between 25 and 75% of the distance between centers of grooves 8 and 9.

As will be understood from the foregoing description, in the pneumatic radial tire of the invention, the tread reinforcement layer is constituted by a steel cord strip layer disposed adjacent the carcass and an aromatic polyamide cord strip layer superposed to the steel cord strip layer, so that the generation of rust of steel cords by the water coming through a crack or the like damage in the tread surface is avoided to ensure a sufficient reinforcement effect. Furthermore, the widths of the main portion and the folded portions of the aromatic polyamide cord strip layer are suitably selected and the free ends of folded portions of the aromatic polyamide cord strip layer are specifically located in relation to the positions of grooves in the tread surface, so as to obtain distinguished durability in heavy-load and high-speed running.

The present invention is not, of course, limited to the above described embodiments but may be modified in various ways within the scope of the appended claims.

What is claimed is:

1. A pneumatic tire with improved durability comprising: a tread having a surface including from 3 to 5 circumferential grooves and a tread surface width, a distance between the center of the outermost circumferential groove and the center of an adjacent circumferential groove being greater than 15% of said tread surface width; a radial carcass under said tread having cords arranged at an angle of 75° to 90° to a circumferential direction of the tire; and a reinforcement layer disposed between said tread and said carcass; said reinforcement layer consisting of a single steel cord strip layer adjacent said carcass and a single aromatic polyamide cord strip layer adjacent the tread surface, exhibiting substantially no thermal shrinkage and the polyamide cords having a tensile strength of at least 10 g/d and a Young's modulus of at least 1500 kg/mm$^2$, said steel cord strip layer and said aromatic polyamide cord strip layer being superposed one on the other in a parallel side-by-side relationship to each other, said aromatic polyamide cord strip layer being folded at its both edges toward the center such that the folded portions contact the central main portion in a parallel side-by-side relationship, said main portion having a width falling between 100 and 110% of said tread surface width, each of said folded portions having a width falling between 30.0 and 32.5% of the width of said main portion; the free edge of each folded portion being positioned at a free-edge distance from the center of the outermost circumferential groove in said tread surface, said free-edge distance amounting to 25 to 75% of said distance between the center of said outermost circumferential groove and the adjacent circumferential groove, said single steel cord strip layer being unfolded and having a width smaller than the width of said main portion of said aromatic polyamide cord strip layer.

2. A pneumatic tire according to claim 1, wherein the cords constituting said radial carcass are arranged at an angle of 85° to 90° to the circumferential direction of said tire.

3. A pneumatic tire according to claim 1, wherein said circumferential grooves in said tread surface are straight grooves.

4. A pneumatic tire according to claim 1, wherein said circumferential grooves in said tread surface are zig-zag grooves.

* * * * *